(12) United States Patent
Chen et al.

(10) Patent No.: US 8,715,614 B2
(45) Date of Patent: May 6, 2014

(54) HIGH-GRAVITY REACTIVE PRECIPITATION PROCESS FOR THE PREPARATION OF BARIUM TITANATE POWDERS

(75) Inventors: Jianfeng Chen, Beijing (CN); Xiaolin Liu, Beijing (CN); Zhigang Shen, Beijing (CN); Guangwen Chu, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 294 days.

(21) Appl. No.: 10/624,944

(22) Filed: Jul. 21, 2003

(65) Prior Publication Data

US 2005/0019248 A1      Jan. 27, 2005

(51) Int. Cl.
*C01G 23/00* (2006.01)

(52) U.S. Cl.
USPC ........................... 423/598; 423/594.16

(58) Field of Classification Search
USPC ............................................. 423/598, 594.16
See application file for complete search history.

(56) References Cited

U.S. PATENT DOCUMENTS

| | | | | |
|---|---|---|---|---|
| 2,985,506 | A * | 5/1961 | Di Vita et al. | 423/598 |
| 4,173,485 | A * | 11/1979 | Woditsch et al. | 501/136 |
| 4,520,004 | A * | 5/1985 | Uedaira et al. | 423/598 |
| 4,624,861 | A * | 11/1986 | Yale et al. | 427/65 |
| 4,670,243 | A | 6/1987 | Wilson et al. | |
| H987 | H * | 11/1991 | Buchanan et al. | 501/137 |
| 5,445,806 | A * | 8/1995 | Kinugasa et al. | 423/598 |
| 5,783,165 | A | 7/1998 | Wilson et al. | |
| 6,129,903 | A * | 10/2000 | Kerchner | 423/598 |
| 6,264,912 | B1 | 7/2001 | Hu | |
| 6,352,681 | B1 * | 3/2002 | Horikawa et al. | 423/598 |
| 6,409,983 | B1 | 6/2002 | Choi et al. | |
| 6,827,916 | B2 * | 12/2004 | Guo et al. | 423/335 |
| 2002/0090335 | A1 * | 7/2002 | Harada et al. | 423/598 |
| 2003/0022784 | A1 * | 1/2003 | Kawamoto et al. | 501/137 |
| 2003/0044347 | A1 * | 3/2003 | Shirakawa et al. | 423/598 |

FOREIGN PATENT DOCUMENTS

| | | | |
|---|---|---|---|
| CN | 95107423.7 | 12/1997 | |
| CN | 95105343.4 | 6/1998 | |
| CN | 00132275.3 | 3/2001 | |
| CN | 98126371.2 | 10/2002 | |
| WO | WO 02/062702 | * 8/2002 | ............ C01B 33/113 |

\* cited by examiner

*Primary Examiner* — Paul Wartalowicz
(74) *Attorney, Agent, or Firm* — Houst Consulting

(57) ABSTRACT

The invention relates to a process for the preparation of fine barium titanate ($BaTiO_3$) powders. The process comprises introducing an aqueous solution (I) containing salts of barium and titanium, and an aqueous basic solution (II) containing an inorganic or organic base separately and simultaneously into a high-gravity reactor with the high-gravity level of 1.25G to 12,500G and performing the reaction of the solution (I) with the solution (II) at a temperature of from 60 to 100° C. The solution (I) is preheated to a temperature ranging from 60° C. to 65° C. and the solution (II) is preheated to a temperature ranging from 60° C. to 100° C. respectively prior to the reaction, in which the Ba/Ti molar ratio in the solution (I) is more than 1 and the concentration of the base in the solution (II) is such that the reaction mixture is maintained at a constant $OH^-$ concentration, preferably a pH value of about 14. The reaction product is separated by filtering and washed with deionized water to remove the impurity ions and excessive barium ions, and then dried to obtain $BaTiO_3$ powders. Said powders consist essentially of crystalline, primary particles having a uniform particle size ranging from 5 to 200 nm, an approximately spherical morphology and a high sintering activity.

8 Claims, 4 Drawing Sheets

Flow chart of the inventive process

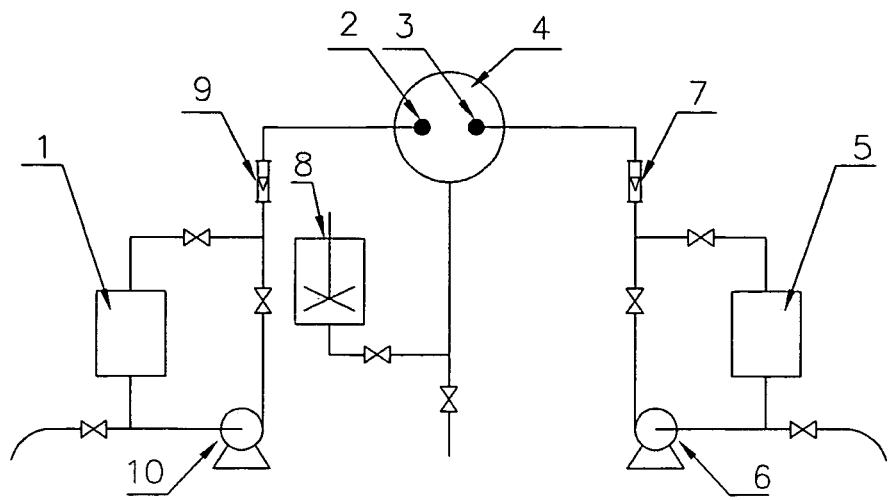
Fig. 7 Flow chart of the inventive process
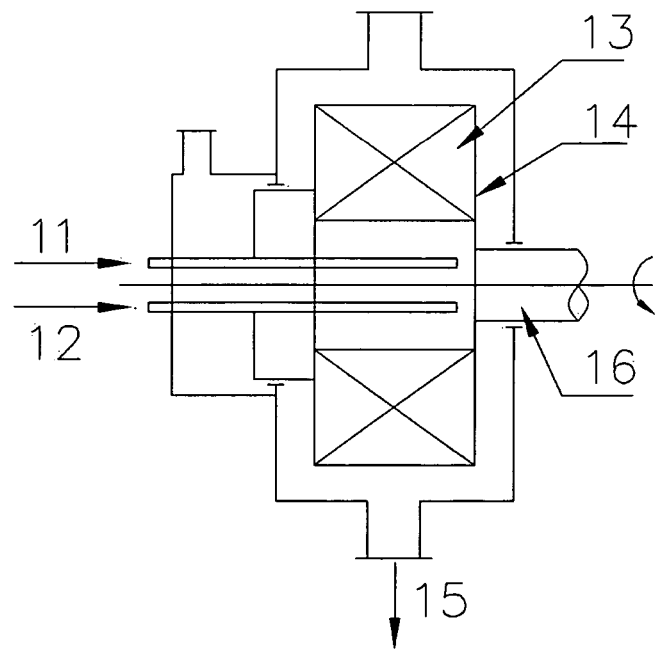
Fig. 8 Schematic of rotating packed bed reactor

HIGH-GRAVITY REACTIVE PRECIPITATION PROCESS FOR THE PREPARATION OF BARIUM TITANATE POWDERS

FIELD OF THE INVENTION

The present invention relates to a process for the preparation of barium titanate powders consisting essentially of nanosized primary particles having a narrow size distribution and an approximately spherical morphology. The powders have great usefulness in many applications such as dielectric, piezoelectric, electrooptic, thermal sensors, and other ceramic industries.

BACKGROUND OF THE INVENTION

Barium titanate powders are widely used as dielectric materials for electronic elements such as PTC thermistors and piezoelectric devices, in particular, are suitable for dielectric layer of multi-layer ceramic capacitors (MLCCs). MLCCs are generally manufactured by alternately laminating a ceramic dielectric layer and an internal electrode layer, firmly pressing them, and then sintering to integrate them. Recently, electronic devices have become much smaller in size and higher in performance than ever before. For such specifications, the ceramic dielectric layer must be thin enough and the capacity of the capacitor must be sufficiently ensured etc. To meet these requirements, the following characteristics are required in the barium titanate powder.

(1) The powder should consist of ultrafine particles, and the particle size should be preferably in the range of 0.05 to less than 0.5 µm, more preferably in the range of 0.05 to less than 0.3 µm, and the particle size distribution should be narrow.

(2) The powder should have good crystallinity, specifically a perovskite structure, having a primary particle size ranging from 0.05 to 0.3 µm.

(3) The barium/titanium molar ratio should be near to 1.00, and particularly in the range of 0.99 to 1.01.

(4) The powder should have excellent dispersion characteristics when it is mixed into slurries or made into a paste.

(5) The powder should have good sintering characteristics.

Barium titanate powders are usually produced by mixing titanium compounds and barium compounds, and then calcining the mixture at a temperature of not less than 1000° C. to carry out a solid phase reaction. However, in such a production process, the above chemical compounds are made to react at higher temperatures, and the particles of the obtained barium titanate powders become relatively large (for example, about 0.5 µm is the lower limit), the particle size distribution thereof is broad, and the shapes thereof are not uniform. Therefore, the conventional powders usually have to be sintered at a temperature of 1350° C. or even higher to produce dielectric ceramics having sufficient dielectric properties suitable for practical use. Hence, at such a sintering temperature, an expensive noble metal is needed to be used as the internal electrode material. In addition, the dispersion characteristics of the barium titanate powders in slurries are not so good. Such a broad range of particle size limits the thickness of the ceramic dielectric layer. As a production process, which can solve this problem, the liquid phase reaction method is known.

Various proposals have been made for this liquid phase reaction method. For example, U.S. Pat. No. 5,783,165 disclosed a production process in which barium titanate can be produced by a method comprising the steps of providing a solution comprising oxalic acid and titanium oxychloride, maintaining the solution at a predetermined temperature, adding barium carbonate to the solution thereby precipitating barium titanyl oxalate, and calcining the barium titanyl oxalate so as to prepare the barium titanate powder.

Another method for the production of barium titanate was presented in U.S. Pat. No. 4,670,243. This method produced very fine, very uniform barium titanate powders with extremely tight stoichiometric control and such powders can give good dielectric properties and need no complicated post-treatment on the product powders in order to adjust the stoichiometry. This process does, however, require the use of expensive tetra-isopropyl titanate as a precursor. As well as being somewhat expensive to manufacture, tetra-isopropyl titanate is a raw material difficult to work with due to its propensity to absorb atmospheric moisture. Further, it is difficult to completely remove the alkaline salts produced during the precipitation process due to the inherent problems associated with filtering extremely fine powders.

U.S. Pat. No. 6,129,903 and U.S. Pat. No. 6,409,983 disclosed some similar processes for producing barium titanate powders under hydrothermal conditions. The salts (e.g. carbonates), hydroxides of barium and titanium are combined in an aqueous mixture. The mixture is adjusted to a basic pH by adding alkaline metal hydroxides or ammonium hydroxide. This mixture is then reacted under hydrothermal conditions to produce crystalline barium titanate powders. The product slurry is cooled, filtered, and washed with water to remove impurities remaining from the salts and the pH adjusting chemicals.

U.S. Pat. No. 6,264,912 disclosed an improved hydrothermal production process in which barium titanate powders could be produced by a two-stage process. The first stage produces high quality monodispersed hydrous titania microsphere particles prepared by homogeneous precipitation via dielectric tuning in alcohol-water mixed solutions of inorganic salts. Titanium tetrachloride is used as an inorganic salt precursor material. The second stage converts the pure hydrous titania microsphere particles into crystalline barium titanate microsphere powders via low-temperature, hydrothermal reactions.

The above-mentioned processes have some disadvantages in that they involve several steps, require calcination or a long reaction time under high temperatures and high pressures to obtain crystalline powders, and require expensive precursors.

A primary object of the present invention, therefore, is to provide an improved process of preparing nanosized crystalline, spherical barium titanate particles having a narrow particle size distribution in one step.

Another object of the present invention is to provide a continuous production process operating in a water-based system and at low temperatures and normal pressures, having a high productivity and at the same time reducing operation costs and units or steps, giving high yields and a high conversion from the starting material to the end product.

A further object of the present invention is to provide an improved process of producing barium titanate powders having superior dielectric properties; low sintering temperatures; excellent dispersibility during the tape casting; and excellent uniformity of the grain sizes in the sintered product.

Still another object of the present invention is to provide barium titanate of tetragonal crystals having an average particle size of at most 200 nm by calcining the barium titanate powders obtained according to the above processes at an appropriate calcining temperature.

SUMMARY OF THE INVENTION

The present invention provides a continuous one-step reaction process, which operates at low temperatures and normal pressures, in very short time and with high yields, for the preparation of nanosized, crystalline barium titanate powders having a narrow particle distribution and an approximately spherical morphology.

More particularly, the present invention provides a continuous one-step reaction process for the preparation of barium titanate powders, which comprises separately and simultaneously introducing into a high-gravity reactor an aqueous solution (I) containing salts of barium and titanium, preheated to a temperature of 60° C. to 65° C., and having a Ba/Ti molar ratio of more than 1, and an aqueous basic solution (II) containing an inorganic or organic base, preheated to a temperature of from 60° C. to 100° C.; and performing the reaction of the solution (I) with the solution (II) at a temperature of from 60° C. to 100° C. and under a high-gravity level of from 1.25G to 12,500G, while maintaining the reaction mixture at a constant $OH^-$ concentration, then filtrating and washing the resulting powdery reaction product with deionized water to remove impurity ions and excessive barium ions, and finally, drying to obtain barium titanate powders.

BRIEF DESCRIPTION OF THE DRAWINGS

FIG. 7 is a flow chart showing the process according to the present invention; and FIG. 8 is the schematic drawing of the high-gravity reactor used in the process according to the present invention.

DETAILED DESCRIPTION OF THE INVENTION

Figure 1:
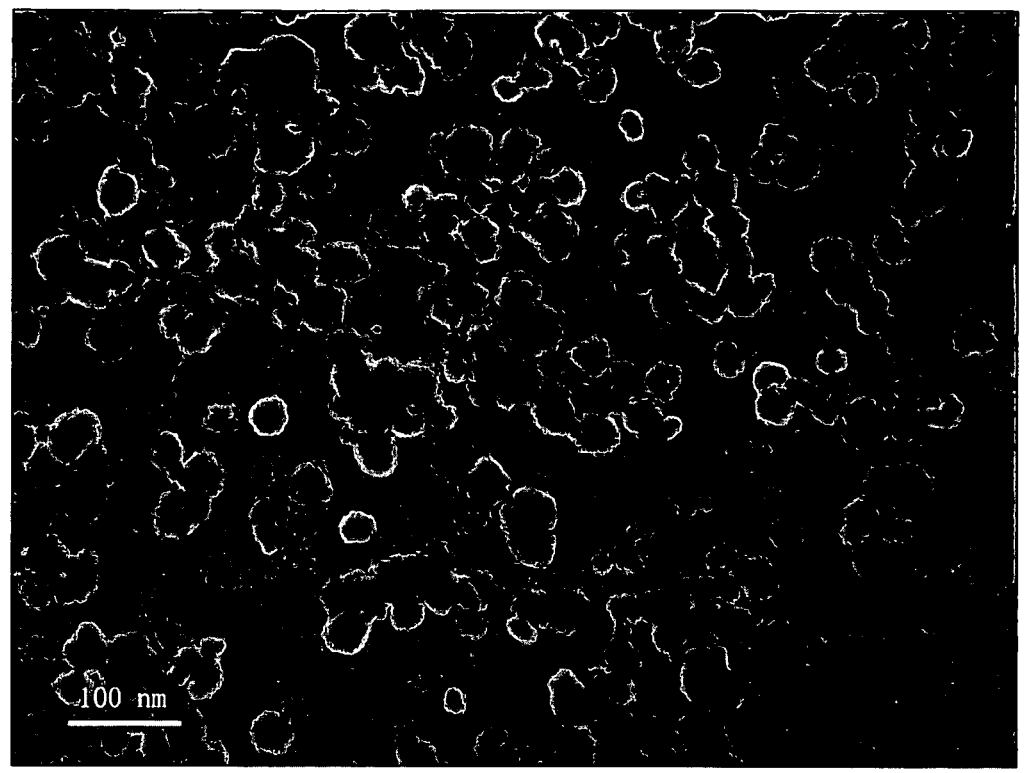
FIG. 1 is a TEM photograph of the barium titanate powders obtained in Example 1.

The present invention is a process for the preparation of nanosized, crystalline barium titanate powders consisting essentially of primary particles having a uniform particle size and an approximately spherical morphology, said process comprising separately and simultaneously introducing into a high-gravity reactor an aqueous solution (I) containing salts of barium and titanium, preheated to a temperature of 60° C. to 65° C., and having a Ba/Ti molar ratio of more than 1, and an aqueous basic solution (II) containing an inorganic or organic base, preheated to a temperature of from 60° C. to 100° C.; and performing the reaction of the solution (I) with the solution (II) at a temperature of from 60° C. to 100° C., preferably from 70° C. to 100° C., more preferably from 80° C. to 100° C. and under a high-gravity level of from 1.25G to 12,500G, while maintaining the reaction mixture at a constant $OH^-$ concentration, preferable a pH value of about 14, then filtrating and washing the resulting powdery reaction product with deionized water to remove impurity ions and excessive barium ions, and finally, drying to obtain the final product.

The salts of barium and titanium used in the process according to the present invention can be selected from the group consisting of halides, nitrate, acetate, perchlorate, oxalate and alkoxides, preferably chlorides. The base used in the present invention can be selected from the group consisting of the alkali metal or alkali-earth metal hydroxides and quaternary ammonium bases, preferably NaOH, KOH or tetramethylammonium hydroxide.

The total concentration of metal ions ($Ba^{2+}+Ti^{4+}$) in the solution (I) can range from 0.1 to 2.0 mol/L, preferably from 0.5 to 1.5 mol/L. The concentration of the base in the solution (II) ranges from 3 to 15 mol/L, preferably from 3 to 9 mol/L, so as to maintain the pH of reaction mixture at a essentially constant level, preferably about 14.

The Ba/Ti molar ratio in the solution (I) should be more than 1, preferably from 1.2 to 2.0.

In the process according to the present invention, the flow rates of the solutions (I) and (II) can be varied from 5 to 300 L/h respectively and the flow rate ratio of the solution (I) to the solution (II) can be varied from 0.5 to 10.

In the process according to the present invention, high-gravity techniques are used to achieve the desirable properties of barium titanate powders. Applying the high-gravity techniques to the reactor design, a new reactor, which is called as rotating packed-bed (RPB) reactor, is designed to be used in the production of nanosized materials. The new process is called as high-gravity reactive precipitation (HGRP) process in the context of the present application. In the HGRP process, reactive precipitation takes place under high-gravity conditions. According to ZL 95107423.7 (its disclosures are incorporated herein by reference), a rotating packed-bed reactor was designed to generate acceleration higher than the gravitational acceleration on the Earth. The high-gravity reactor used in the process according to the present invention is a rotating packed-bed reactor and rotates at such a speed that the high-gravity level NG produced in the reactor reaches 1.25G to 12,500G by the driving force from an axis, preferably from 2.89G to 3215G, more preferably from 5G to 1125G, still more preferably from 31.25G to 500G, where $N=(2\pi n/60)^2 r/G$, G is the gravitational acceleration speed (9.8 m/s$^2$), n is the rotating speed (rpm) of the rotator and r is the mean radium (in meter) of the rotator.

According to ZL 95105343.4, ZL 98126371.2, ZL 00132275.3, ZL 95105343.4 (their disclosures are incorporated herein by reference), the advantages and industrial potentials of this technology have been demonstrated by the successful synthesis of nanoparticles such as $CaCO_3$, aluminum hydroxide and $SiO_2$.

According to one embodiment of present invention, the present invention provides a process for the preparation of crystalline barium titanate powders as shown in FIG. 7, in which an aqueous solution (I) is pumped by a pump (6) from a cylinder (5) through a flow gauge (7) and a liquid inlet (3) into a RPB reactor (4), and at the same time, a solution (II) is pumped by a pump (10) from a cylinder (1) through a flow gauge (9) and a liquid inlet (2) into the RPB reactor (4). Under the rotating conditions of the reactor, the solutions (I) and (II) are mixed and reacted with each other in the RPB reactor (4) at a temperature of from 60° C. to 100° C. After the completion of the reaction, the precipitates of crystalline barium titanate are separated from the mother liquor by filtrating, washed with deionized water and finally, dried at 85° C. overnight to obtain the $BaTiO_3$ powders.

The high-gravity reactor (RPB reactor) used in the process according to the present invention is shown in FIG. 8. The key part of the RPB reactor is a packed rotator (13). The rotator is installed inside the fixed casing (14) and rotates at a speed of several hundreds to tens of thousands rpm by the driving force from an axis (16) (corresponding to the high-gravity level of several G to tens of thousands G).

The process according to the present invention is rapid, requires low temperatures, gives high yields and is essentially quantitative. Crystalline particles of $BaTiO_3$ can be produced within several seconds at a temperature not exceeding 100° C., without a pressurized reactor. It is more interesting that the process according to the present invention can be continuously carried out in an industrial scale.

The crystalline powders obtained by the process according to the present invention can be sintered at a temperature of from 1100° C. to 1200° C. to produce ceramics exhibiting uniform microstructures, homogeneous chemical compositions, small grain sizes and dielectric constants as high as 2,500.

The powders prepared by the process according to the present invention are characterized by their chemical composition, crystallinity, morphology, and particle size distribution.

Chemical Composition

The chemical compositions are determined by an induction coupled plasma (ICP) technique, gravimetric and titration analysis. For barium titanate powders, approximately one-half gram of the dry solid is dissolved in 15 mL of hot concentrated hydrochloric acid, and the final volume is adjusted to 300 ml using deionized water. Under boiling and stirring conditions, 25 mL aqueous solution of $(NH_4)_2SO_4$ (250 g/L) is added to the above solution. The resulting white precipitate is separated from the mother liquor by filtration using non-ash filter paper, placed in a crucible, and then burnt at 800° C. for 1 hour. The white powder is weighed as $BaSO_4$.

The titanium content is then determined by a titration technique. For barium titanate powders, approximately 0.4 g of the dry solid is dissolved in 20 mL of hot concentrated sulfuric acid and 10 g $(NH_4)_2SO_4$. After cooling to room temperature, 80 mL of deionized water and 20 mL of concentrated hydrochloric acid are added. Under the atmosphere of $CO_2$, 2.5 g of highly pure aluminum are admixed until dissolved. After cooling to room temperature, 3 mL of saturated KSCN solution is added as an indicator, and then the entire system is titrated with 0.1 mol/L $NH_4Fe(SO_4)_2$ solution.

Crystallinity

The crystalline phase is identified by an X-ray Diffractometer (D/MAX 2500 VB2+/PC, Rigaku, Tokyo, Japan) using Ni-filter Cu Kα radiation, 2θ=20–80°.

Morphology

The morphology and particle size of the powders are characterized by transmission electron microscopy (TEM model H-800, Hitachi, Japan). The TEM specimens are prepared by dispersing the as-prepared $BaTiO_3$ particles in ethanol under the ultrasonic conditions for 15 min, and then picking up using a carbon film supported by a copper grid. The microstructure of the sintered pellet is observed by scanning electron microscopy (SEM, Cambridge, S-250, MK3, UK).

Sintering Conditions

The powders are further sintered and the dielectric constants are determined on the sintered pellets by using the following conditions and methods.

To make a green pellet, about 1 g of powder is placed in a cylindrical die and uniaxially pressed under 2 MPa using a powder compaction equipment (DY-30, Tianjin Science and Technology Co.). The pellet is placed in an oven at 100° C. overnight and weighed after cooling. In order to improve the body integrity of the sintered pellets, it may be useful to incorporate a known binder in the green bodies. The binder may be selected from polyvinyl alcohol, polyvinylbutyral, and polyethylene glycol, and normally is incorporated in an amount of 0.5 to 4.0% by weight of the green pellets.

The green pellets are then sintered in a high temperature furnace (Nabertherm LHT08/16, Lilienthal, German) under air at a heating rate of 2° C./min from room temperature to 600° C., then at a rate of 8° C./min from 600° C. to the sintering temperature up to 1200° C. The sintered sample dimensions are measured using vernier calipers so as to calculate the dielectric constant.

Dielectric Constant

To determine the dielectric constants, a sintered pellet is coated with Ag film on both sides, and fired at 800° C. for 30 min, placed between two paralled copper electrodes, and the capacitances are then evaluated at a frequency of 1 kHz at a temperature ranging from −50° C. to 150° C. by a HP-4192 impedance analyzer (Agilent Technology Co. Ltd). The dielectric constants are calculated from the capacitances so obtained and the dimensions.

The present invention will be explained in more details with reference to the following examples.

EXAMPLE 1

Barium Titanate Powders by the High-Gravity Reactive Precipitation (HGRP) Process The preparation of barium titanate powders is carried out according to the flow chart as showed in FIG. 7.

An aqueous solution (I) of barium and titanium is obtained by mixing 1 mol/L solution of $BaCl_2$ and 2.5 mol/L solution of $TiCl_4$. The final volume is adjusted to 15 L, using deionized water. The total concentration of the $BaCl_2$ and $TiCl_4$ solution is 1.025 mol/L, while Ba/Ti molar ratio is kept at 1.5.

3000 g of NaOH (analytical grade) are added to 12.5 L of deionized water with stirring to give 6 mol/L aqueous solution (II) of NaOH.

15 L of the solution (I) is preheated to a temperature of about 60° C. and then pumped by pump (6) from cylinder (5) through flow gauge (7) and liquid inlet (3) at a flow rate of 90 L/h into the RPB reactor (4), and at the same time, 12.5 L of the solution (II) is preheated to a temperature of 90° C. and then pumped by pump (10) from cylinder (1) through flow gauge (9) and liquid inlet (2) at a flow rate of 75 L/h into the RPB reactor (4). Under the rotating conditions of the reactor, solutions (I) and (II) are mixed and reacted with each other in the RPB reactor (4) at a temperature of 85-88° C. to yield a $BaTiO_3$ slurry instantaneously. Finally, the $BaTiO_3$ slurry flowed out through liquid exit (8). The introduction of solutions (I) and (II) lasted for 10 minutes. In this example, the high-gravity level of the RPB reactor is 180G.

After the completion of the reaction, the precipitated particles of crystalline barium titanate are separated from the mother liquor by filtration, and purified by washing with deionized water and, finally dried at 85° C. overnight in a vacuum oven.

The TEM photograph of the obtained $BaTiO_3$ powder shown in FIG. 1 indicates that the particles are spherical particles having an average particle size of 35 nm and a narrow particle size distribution.

Figure 2:
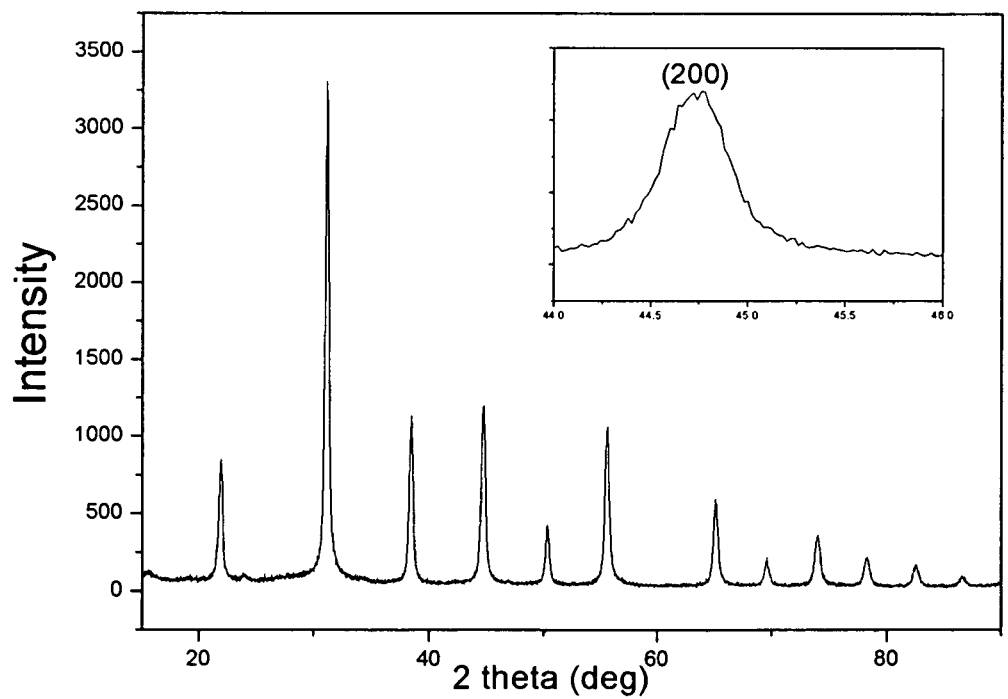
FIG. 2 is an X-ray diffraction pattern (XRD) of the barium titanate powders obtained in Example 1 and the inset represents the enlarged XRD pattern in the 2-theta range of from 44.0 to 46.0.
Figure 3:
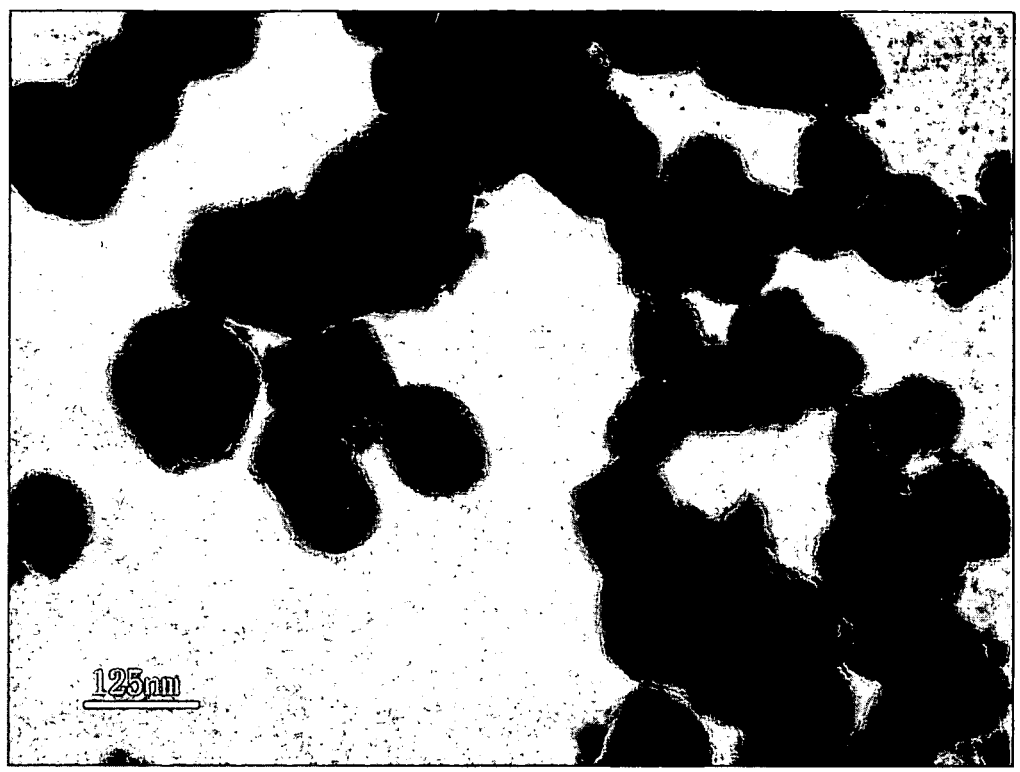
FIG. 3 is a TEM photograph of the barium titanate powders obtained in Example 2.

X-ray diffraction pattern of $BaTiO_3$ powder shown in FIG. 2 exhibits the same peak position as standard cubic phase barium titanate (JCPDS No. 31-174).

The Ba/Ti molar ratio of obtained barium titanate powders is confirmed via chemical analysis to be 1.000±0.005.

Figure 5:
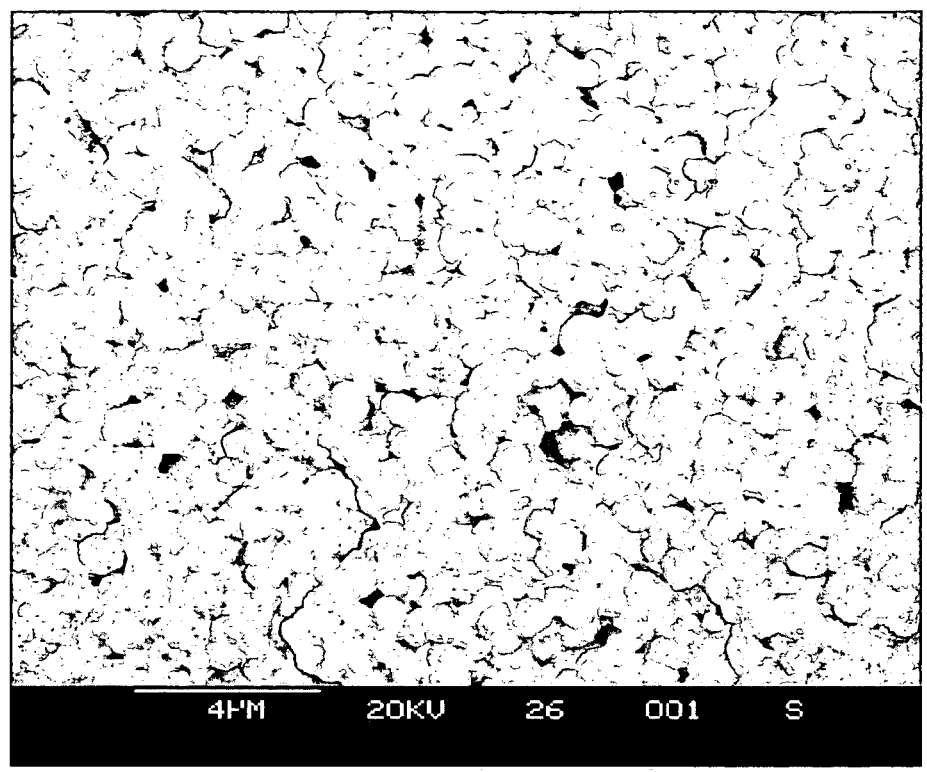
FIG. 5 is an SEM photograph showing the microstructure of the pellets obtained by sintering the powders shown in FIG. 1 at 1100° C. for 2 hours.
Figure 6:
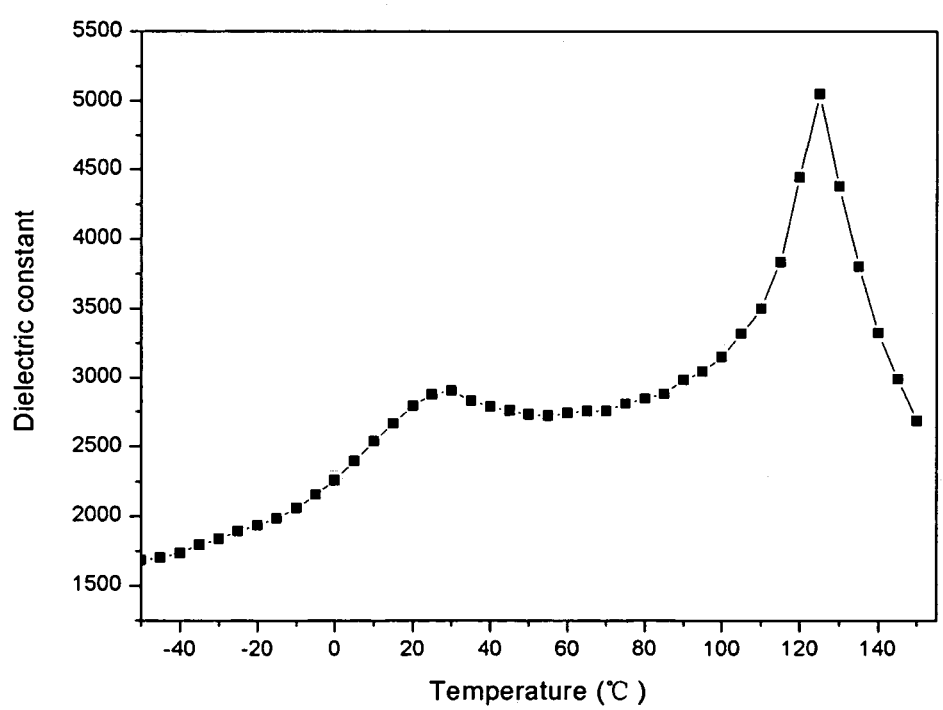
FIG. 6 is a plot of the dielectric constant K vs. temperature for the pellets shown in FIG. 5.

The powder is pressed into pellets and sintered at 1100° C. for 2 hours, according to the procedure previously described. FIG. 5 shows SEM photograph of the sintered pellet containing the powder produced in this example. The grains in the sintered pellet are small and uniform, with the average size being 0.8 μm. The dielectric constant of the pellet is measured as a function of temperature, and the results are shown in FIG. 6. There is a curie temperature at 120° C., at which the dielectric constant peaks. At room temperature, the ceramics has a dielectric constant of 2500. The results also show that $BaTiO_3$ powders prepared by the HGRP process has a higher sintering activity which can be seen from the low sintering temperature, that is to say, 1100° C., which is the lower limit in the literature for pure $BaTiO_3$ powders using conventional sintering.

In the following examples, the analysis of the products and the measurement are same as in Example 1.

EXAMPLE 2

Example 1 is repeated, except that the as-prepared barium titanate powders are calcined at a temperature of 1000° C. for 2 hours.

Figure 4:
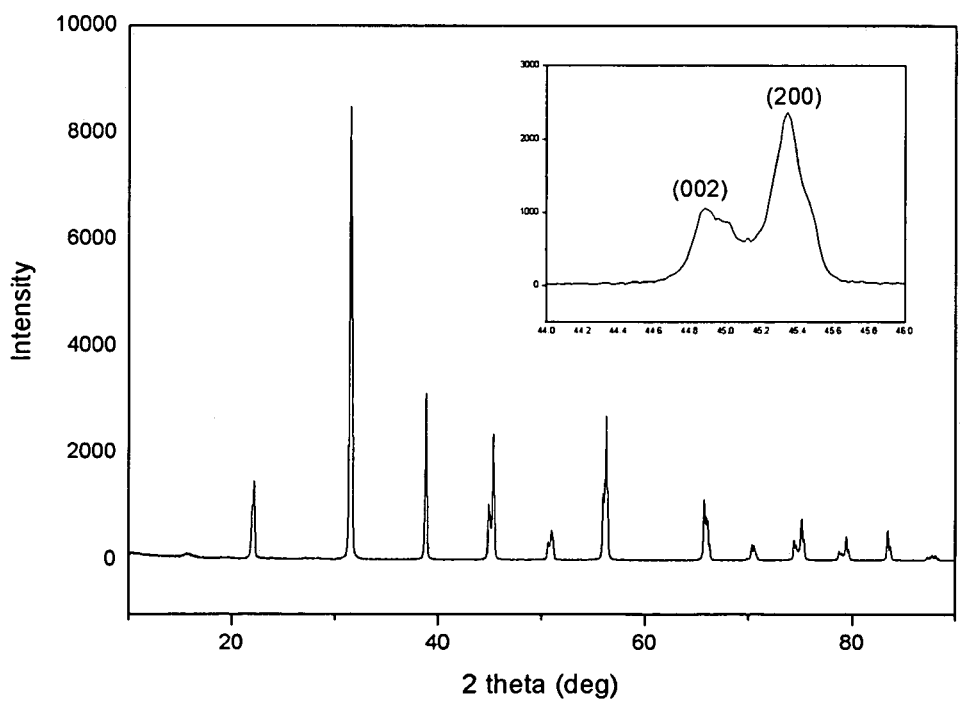
FIG. 4 is an X-ray diffraction pattern of the barium titanate powders obtained in Example 2 and the inset represents the enlarged XRD pattern in the 2-theta range of from 44.0 to 46.0.

A microphotograph of the thus-obtained barium titanate fine powder by a TEM is shown in FIG. 2 and the X-ray diffraction pattern thereof is shown in FIG. 4.

In FIG. 4, a separation of peaks for (200) plane and (002) plane is observed, and accordingly it is understood that the powder is tetragonal barium titanate.

The results indicate that the cubic $BaTiO_3$ powders produced by the HGRP process can be transformed to tetragonal phase at high calcining temperatures without excessive particles growth. The average particle size of the obtained powder is 150 nm.

EXAMPLE 3

A series of experiments are carried out in the RPB reactor to examine the effect of the high-gravity level NG of the rotator in the rotating packed-bed reactor on the particle size of the obtained powders.

Example 1 is repeated, except that the high-gravity level varies from 31.25G to 3125G. The resulting particles are treated same as in Example 1.

The average particle size of the obtained powder decreases from 200 nm to 25 nm, with the high-gravity level of the RPB reactor increasing from 31.25G to 3125G, while the other characteristics are same as those obtained in Example 1.

EXAMPLE 4

A series of experiments are carried out in the RPB reactor to examine the effect of the concentration of NaOH solution on the particle size of the obtained powders.

Example 1 is repeated, except that the concentration of NaOH is from 3 to 9 mol/L. The resulting particles are treated same as in Example 1.

The results show that the average particle size decreases from 120 nm to 25 nm, with the concentration of NaOH increasing from 3 to 9 mol/L, while the other characteristics are same as those obtained in Example 1.

EXAMPLE 5

A series of experiments are carried out in the RPB reactor to examine the effect of the flow rate of NaOH solution on the particle size of the obtained powders.

Example 1 is repeated, except that the flow rate of NaOH solution varied from 45 to 180 L/h.

The obtained dispersions, treated as in Example 1, give powders consisting of particles, which are well crystalline and spherical in shape. The particle size increased from 25 nm to 200 nm, with the flow rate decreasing from 180 to 45 L/h, while the other characteristics are same as those obtained in Example 1.

EXAMPLE 6

This experiment is carried out in the RPB reactor to examine the effect of the flow rates of $BaCl_2$ and $TiCl_4$ solution and NaOH solution on the properties of the obtained powders.

Example 1 is repeated, except that the flow rates of $BaCl_2$ and $TiCl_4$ solution and NaOH solution are 180 and 150 L/h, respectively.

The resulting particles are treated same as in Example 1. Barium titanate particles so obtained have the same characteristics as those in Example 1. This process yields twice the weight of the solid as compared to Example 1.

EXAMPLE 7

A series of experiments are carried out in the RPB reactor to examine the effect of the Ba/Ti molar ratio in solution (I) on the properties of the obtained powders.

Example 1 is repeated, except that the Ba/Ti molar ratio in solution (I) varies from 1.00 to 1.50. The resulting particles are treated same as in Example 1.

The average particle size of obtained powders is decreased from 80 nm to 35 nm with the Ba/Ti molar ratio in the solution (I) increasing from 1.00 to 1.50, while the other characteristics are same as those obtained in Example 5.

EXAMPLE 8

A series of experiments are carried out in the RPB reactor to examine the effect of the total concentration of metal ions in solution (I) while the Ba/Ti molar ratio is kept at 1.50.

Example 1 is repeated, except that the total concentration of metal ions ($Ba^{2+}+Ti^{4+}$) varies from 0.50 to 2 mol/L. The resulting particles are treated same as in Example 1.

The results show that the average particle size decreases from 200 nm to 25 nm, with the total concentration of metal ions ($Ba^{2+}+Ti^{4+}$) increasing from 0.5 to 2 mol/L.

EXAMPLE 9

This experiment shows the result when NaOH is substituted by KOH.

Example 1 is repeated, except that the NaOH solution is substituted by KOH solution (6 mol/L). The precipitate is purified and dried as previously described in Example 1. The so obtained powder shows the same characteristics as those of the powder obtained according to Example 1.

EXAMPLE 10

This experiment shows the result when NaOH solution is substituted by tetramethylammonium hydroxide solution.

Example 1 is repeated, except that the NaOH solution is substituted by tetramethylammonium hydroxide solution (25 wt %). The precipitate is purified and dried as previously described in Example 1. The so obtained powder shows the same characteristics as those of the powder obtained according to Example 1.

What is claimed is:

1. A process for the preparation of barium titanate powders, comprising separately and simultaneously introducing into a high-gravity reactor an aqueous solution (I) containing salts of barium and titanium, preheated to a temperature of from 60° C. to 65° C., and having a Ba/Ti molar ratio of from 1.5 to 2.0, and an aqueous basic solution (II) containing an inorganic or organic base, preheated to a temperature of from 60° C. to 100° C.; performing the reaction of the solution (I) with the solution (II) at a temperature of from 60° C. to 100° C., while maintaining the reaction mixture at a constant $OH^-$ concentration to yield a barium titanate slurry, then filtrating the slurry to produce a powdery reaction product and washing the resulting powdery reaction product with deionized water to remove impurity ions and the excessive barium ions, and finally, drying to obtain barium titanate powders.

2. A process according to claim 1, in which in the solution (I), the total concentration of barium and titanium ions ranges from 0.1 to 2.0 mol/L, and the base concentration in the solution (II) ranges from 3 to 15 mol/L.

3. A process according to claim 1, in which the flow rates of the solutions (I) and (II) vary from 5 to 300 L/h.

4. A process according to claim 1, in which the flow rate ratio of solution (I) to solution (II) ranges from 0.5 to 10.

5. A process according to claim 1, in which the pH value of the reaction mixture is maintained constant at about 14.

6. A process according to claim 1, in which the salts of barium and titanium are selected from the group consisting of halides, nitrate, acetate, perchlorate, oxalate and alkoxides, and the base is selected from the group consisting of alkali metal or alkali-earth metal hydroxides, and quaternary ammonium bases.

7. A process according to claim 1, in which the salts are chlorides and the base is NaOH, KOH or quaternary ammonium bases.

8. A process according to claim 1, in which said high-gravity reactor is a rotating packed-bed reactor and the high-gravity level of the rotating packed-bed reactor ranges from 1.25G to 12,500G.

* * * * *